(12) United States Patent
Hong

(10) Patent No.: US 8,709,263 B2
(45) Date of Patent: Apr. 29, 2014

(54) PRESSURIZING-DEPRESSURIZING CYCLES FOR REMOVAL OF CONTAMINANTS IN ENVIRONMENTAL SAMPLES

(75) Inventor: P. K. Andy Hong, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 599 days.

(21) Appl. No.: 12/296,840

(22) PCT Filed: Apr. 11, 2007

(86) PCT No.: PCT/US2007/008984
§ 371 (c)(1),
(2), (4) Date: Oct. 10, 2008

(87) PCT Pub. No.: WO2007/120735
PCT Pub. Date: Oct. 25, 2007

(65) Prior Publication Data
US 2009/0159536 A1    Jun. 25, 2009

Related U.S. Application Data

(60) Provisional application No. 60/790,894, filed on Apr. 11, 2006, provisional application No. 60/818,474, filed on Jul. 3, 2006.

(51) Int. Cl.
*C02F 1/20*    (2006.01)
*C02F 1/50*    (2006.01)
*C02F 1/74*    (2006.01)
*C02F 1/76*    (2006.01)
*C02F 1/78*    (2006.01)

(52) U.S. Cl.
USPC ........... 210/754; 210/758; 210/759; 210/760; 210/764; 210/808; 210/909; 210/910; 210/912; 588/20; 422/33; 422/39

(58) Field of Classification Search
USPC ......... 210/749, 752, 753, 758, 760, 761, 765, 210/808, 909, 910, 912, 764, 754, 759; 405/128.75; 588/20; 422/33, 39
See application file for complete search history.

(56) References Cited

U.S. PATENT DOCUMENTS 3,682,314 A * 8/1972 Blatter ............... 210/199
3,847,803 A * 11/1974 Fisk ................... 210/760

(Continued)

FOREIGN PATENT DOCUMENTS

TW    1256312    6/2006

OTHER PUBLICATIONS

Andy Hong et al., Degradation of MTBE by Ozone and Hydrogen Peroxide. Powerpoint. Presented at the AEHS conference, San Diego. Mar. 21, 2007. pp. 1-7.

*Primary Examiner* — Lucas Stelling
(74) *Attorney, Agent, or Firm* — Thorpe North & Western LLP

(57) ABSTRACT

A method of removing contaminants from slurry samples is set forth. The method includes the utilization of repeated pressurizing and depressurizing steps to disrupt solidified particles in solid-containing slurries thereby increasing decontamination efficiency. An expansion fluid is injected into the slurry sample sufficient to create microbubbles when the slurry sample is depressurized. The micro bubbles mechanically disrupt the solidified particles increasing contaminant exposure. The microbubbles also provide for increased interfacial regions where contaminants can accumulate at gas-liquid thin films that are in close proximity to and can be effectively removed using a suitable expansion fluid and optional decontamination agents.

34 Claims, 1 Drawing Sheet

(56) References Cited

U.S. PATENT DOCUMENTS

| | | | |
|---|---|---|---|
| 4,081,031 A | | 3/1978 | Mohaupt |
| 4,159,944 A | * | 7/1979 | Erickson et al. ............. 210/910 |
| 5,167,806 A | * | 12/1992 | Wang et al. ................. 210/805 |
| 5,303,871 A | | 4/1994 | Bateson et al. |
| 5,868,945 A | * | 2/1999 | Morrow et al. ............... 210/760 |
| 6,068,778 A | * | 5/2000 | Steiner et al. ................ 210/765 |
| 6,200,486 B1 | * | 3/2001 | Chahine et al. ............... 210/749 |
| 6,206,098 B1 | | 3/2001 | Cooper et al. |
| 6,221,260 B1 | * | 4/2001 | Chahine et al. .......... 210/748.11 |
| 6,241,019 B1 | | 6/2001 | Davidson et al. |
| 6,503,403 B2 | | 1/2003 | Green et al. |
| 6,568,900 B2 | * | 5/2003 | Conrad et al. ................ 415/910 |
| 6,773,603 B2 | | 8/2004 | Moorehead et al. |
| 6,984,329 B2 | | 1/2006 | Kerfoot |

* cited by examiner

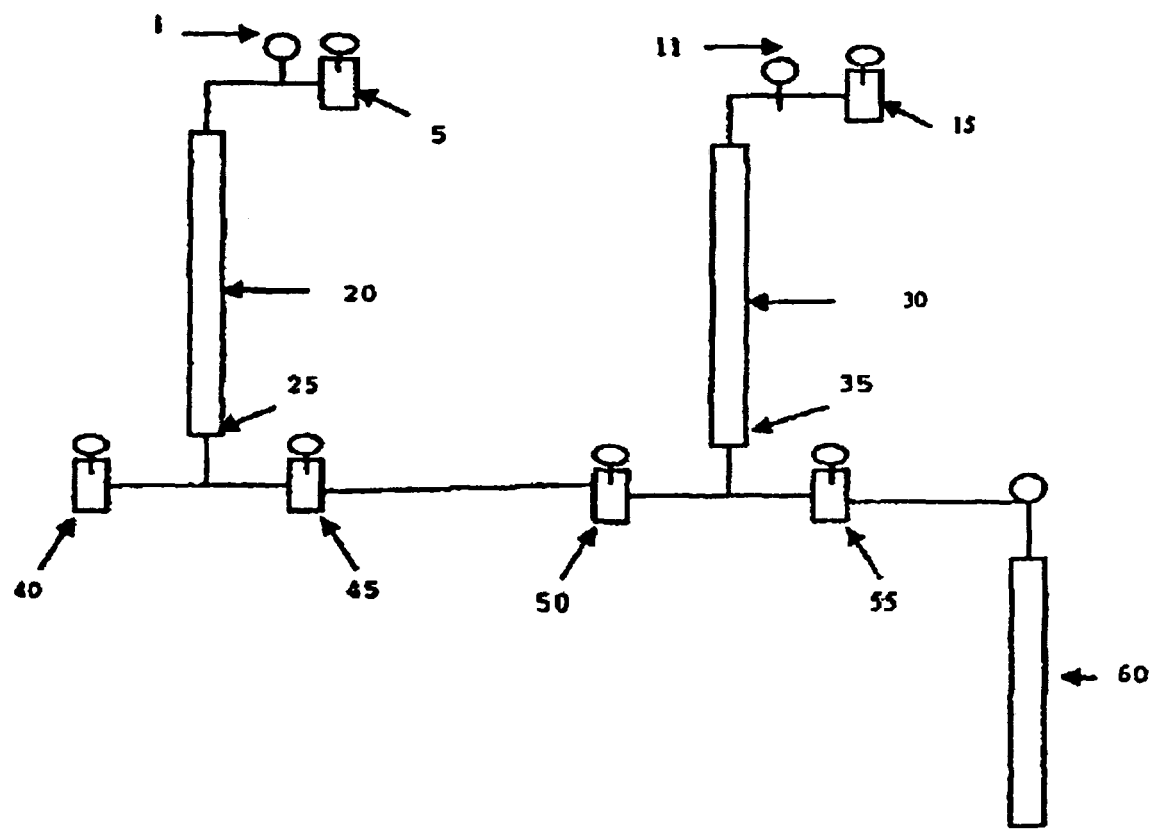

PRESSURIZING-DEPRESSURIZING CYCLES FOR REMOVAL OF CONTAMINANTS IN ENVIRONMENTAL SAMPLES

RELATED APPLICATIONS

This application claims the benefit of U.S. Provisional Application Nos. 60/790,894, filed Apr. 11, 2006, and 60/818,474, filed Jul. 3, 2006, each of which is incorporated herein by reference.

FIELD OF THE INVENTION

The present invention is drawn to methods of removing contaminants from environmental samples. More specifically, the invention relates to processes and methods using pressurizing-depressurizing treatment for rehabilitation of contaminated samples.

BACKGROUND OF THE INVENTION

Population centers in the U.S. and around the world will face increasing challenges to provide safe water supplies, and will increasingly demand new technologies for reclamation and reuse of wastewater.

Accordingly, supplies of safe drinking water will continue to be an important issue as science and techniques addressing water quality issues advance. The availability of technically and economically effective technologies for water treatment and reclamation is desirable. The presence of new contaminants of concern such as those identified by EPA's CCL 2 and effective methods for their control, therefore, is an important issue.

The removal of carbon, nitrogen, phosphorus, and micronutrients has become important to improving the quality of polluted water and restoring ecological balance. It is widely known that many aquatic plants absorb metals beyond their immediate needs, thus bio-concentrating them within plant cells as they remove them from water. Algae and other aquatic plants can take up primary and micronutrients that may be present in overabundance, such as carbon, nitrogen, phosphorus, potassium, iron, aluminum, calcium, and other substances and thus can be utilized to remediate an ecosystem.

The prior art teaches that there are many processes for bioremediation. One such natural process is when water flows over stationary algae or periphyton which, like all plants, require carbon. Periphyton has a higher productivity than any terrestrial plant. As modeled using the partial pressure of gas laws, this creates a significant consumption of carbon dioxide. Conservatively, 20 times more $CO_2$ (in the form of bicarbonate) is absorbed by periphyton as is absorbed by a mature forest land on an equal area. Significantly higher cell productivity of periphyton greatly affects $O_2$ production producing many times more $O_2$ per unit area.

Water remediation by regularly harvested periphyton has been shown to be 50 to 1000 times higher than constructed wetland systems per unit area. Accordingly, remediation can occur when water flows over man-made or artificial stationary algae taking up macro nutrients (carbon, nitrogen and phosphorus) and micro nutrients, while discharging oxygen as high as three times saturation. Further, this high oxygen and hydroxyl environment can reduce organic sediments by 0.25 meters per year. In extended time experiments, periphyton increases pH due to carbon uptake to as high as 11. Filtration can occur through adsorption, absorption, physical trapping, and other more complex means.

Further studies of periphyton filtration are disclosed in U.S. Pat. Nos. 4,333,263; 5,131,820; 5,527,456; 5,573,669; 5,591,341; 5,846,423; and 5,985,147. Periphyton filters (PF) have found use in a variety of applications, for example, as filters in aquaria, natural periphyton are used to remove nutrients and other contaminants from polluted waters. However, such natural processes require large areas and consume vast resources and are impractical for large scale operation.

Other wastewater treatment techniques known in the art include the treatment of wastewater with ozone (triatomic oxygen or $O_3$). Ozone is a naturally occurring gas created, for example, by the force of corona discharge during lightning storms or by UV light from the sun. Ozone occurs in an upper atmospheric layer and is believed to be critical to the temperature balance on Earth, while ozone in the lower atmosphere is commonly viewed as a pollutant. Ozone treatment is currently used for drinking and wastewater treatment as well as air filtration with doses taking into account health and safety factors. Examples of patents discussing the treatment of a sample with ozone include, among others, U.S. Pat. Nos. 7,014,767; 6,991,735; 6,394,329; 6,962,654; 6,921,476; 6,835,560; 6,780,331; and 6,726,885.

As well, it is known in the art to use microbubbles to treat a sample, such as a wastewater. Examples of the use of microbubbles to treat wastewater include generating microbubbles, coating them with a contaminant degenerative liquid, and passing the coated microbubbles through a wastewater stream. Other microbubble techniques include aeration of septic tanks by drawing atmospheric air into an expansion chamber and from there into agitated sludge to provide low pressure small microbubbles which have long residence times in the sludge material. Aeration devices which disperse microbubbles into a liquid and maintain transfer of gas to the liquid across a fiber membrane are also used where gas pressures are above the bubble point of the fiber membranes. A cloud of microbubbles is expelled into the liquid as it is forced to flow past the fibers. Although somewhat effective in decontamination, these approaches can be limited in their efficiencies, can require expensive equipment, and can be difficult to maintain.

Despite the above approaches and technologies, the need remains for methods and systems which can further increase treatment efficiencies and are safe, reliable and cost effective.

SUMMARY OF THE INVENTION

The present invention provides a method of removing contaminants from samples, particularly slurry samples, involving the steps of pressurizing the sample, injecting the sample with an expansion fluid, and depressurizing the sample. The sample is pressurized and the expansion fluid is injected directly into the sample. Injecting and pressurizing can generally be performed simultaneously, although sequential performance is also suitable for some embodiments. After pressurizing, the sample is depressurized such that the expansion fluid forms microbubbles in the sample. The microbubbles disrupt any solids within the sample in a manner sufficient to increase decontamination efficiency. The pressurizing and depressurizing steps are then repeated at least once. Depending on the particular expansion fluid and contaminant combination, the microbubbles can also act as microreactors which provide ample reactive zone at the gas-liquid interface for increased contact with contaminants.

In another embodiment, the present invention provides for a method of removing contaminants from contaminated samples involving the steps of pressurizing the sample containing the contaminant, injecting the sample with an expansion fluid, and depressurizing the sample. The expansion fluid contains at least one decontaminating compound selected from oxidizing agents, phase transfer agents, and extraction agents. Alternatively, decontaminating compounds such as phase transfer agents and extraction agents can be added to the contaminated sample prior to injection of the expansion fluid. After the pressurizing, the sample can be depressurized to a second pressure which is at least 10 psi lower than the first pressure. During the pressurization step the expansion fluid forms microbubbles in the sample. The microbubbles disrupt the solid particulates in the slurry sample such that they fracture and expose the contaminants contained inside to the decontaminating compound. The pressurizing, injecting, and depressurizing steps are then repeated from 2 to 100 times, depending on the particular system.

A greater understanding of the present invention may be had from reference to the following detailed description and the appended claims.

BRIEF DESCRIPTION OF THE FIGURE

FIG. 1 is an illustration of an embodiment of an apparatus for performing one embodiment of a process of the invention. The apparatus is further described in Example 4.

DETAILED DESCRIPTION OF EMBODIMENTS OF THE INVENTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used herein, the singular forms of "a," "an," and "the" include plural referents unless the context clearly dictates otherwise. Thus, for example, reference to "a contaminant" includes one or more of such contaminants, reference to "an expansion fluid" includes reference to one or more expansion fluids, and reference to "injecting" includes reference to one or more of such steps.

Definitions

As used herein the term, "air" means and refers to a gaseous mixture that comprises at least about 20 mole percent $O_2$.

As used herein, the term "bacteria" means and refers to unicellular microorganisms as conventionally understood, although other microorganisms such as viruses, fungi, and other bioactive materials can be effectively treated with the present invention.

As used herein, the term "contaminant" or "contaminants" means and refers to any agent that directly, or indirectly, has a detrimental effect on the environment or a living creature (e.g., human, animal, insect, plant), such as, but not limited to a chemical, biological, inorganic, or combinations of these contaminants. Contaminants can include volatile organic compounds, non-volatile organic compounds, polyaromatic hydrocarbons (PAHs) (e.g., anthracene, fluoranthene, phenanthrene, naphthalene); polychlorinated biphenyls (PCBs) (e.g., arochlor 1016); hydrocarbons (e.g., petroleum residues from oil and gas production, etc.), chlorinated hydrocarbons (e.g., tetrachloroethene, cis- and trans-dichloroethene, vinyl chloride, 1,1,1-trichloroethane, 1,1-dichloroethane, 1,2-dichloroethane, methylene chloride, chloroform, etc.); methyl tertiary-butyl ether (MTBE); and BTEX (e.g., benzene, toluene, ethylbenzene, xylenes, and the like); explosive residues (e.g., nitrobenzenes, RDX, HMX, trinitrotoluene (TNT), nitroaromatics, etc.); chlorinated pesticides (e.g., chlordane, heptachlor, etc.); microorganisms such as *E-Coli*, Coliform, bacteria, virus, etc.; inorganic materials such as metals, nitrates, semi-metals, etc; and/or the like. The microbubbles, apparatuses, and methods herein are useful in remediating contaminants, including any one, or combinations of those delineated herein.

As used herein, the term "expansion fluid" refers to a continuous, amorphous fluid substance whose molecules move freely past one another and that has the tendency to assume the shape of its container, for example, a liquid or a gas or a mixture of both, and exhibits substantial volumetric changes with changes in pressure. The expansion fluid can include, or consist essentially of, active compounds such as oxidizing agents, extraction agents, and/or a reactive or non-reactive gas or gas mixture.

The term "extraction agents" refers to compounds which are capable of isolating and either removing or facilitating removal of contaminants from a sample. Examples of extraction agents include phase transfer agents and chelating agents.

A "phase transfer agent" as used herein means an agent that facilitates transfer of another entity from one phase to another phase. For example, a phase-transfer agent has the ability to shuttle back and forth across a membrane, carrying a normally insoluble aqueous based compound to an organic phase, or carry a charged or polar compound to the aqueous phase. Examples of phase transfer agents are quaternary ammonium salts and crown ethers.

As used herein, the term "chelating agent" refers to any compound or collection of compounds which can reversibly bind (i.e. complex) to a metal. For example, the chelant, chelator, chelating agent, sequestering agent, or complexing agent can bind to a metal ion, forming a metal complex (i.e., chelate). Metal ions are examples of contaminants which can be bound by common chelating agents, although the chelating agent can also bond with other contaminants.

The term "oxidizing agents" includes any chemical compound or group of compounds which alone or collectively can oxidize and eliminate or destroy a contaminant. Examples of oxidizing agents which can be used in the present invention include but are not limited to ozone, perchlorate, hydrogen peroxide, permanganate, chlorine gas, phenolic compounds, and combinations thereof.

As used herein, the term "ozone" means and refers to a colorless gaseous substance ($O_3$) obtained (as by the passage of an electrical current in oxygen) as an allotropic form of oxygen, containing three atoms in the molecule. Ozone is about 1.5 times as dense as oxygen and 12.5 times more soluble in water and at high doses leaves substantially no residuals or byproducts except oxygen and a minimal amount of carbon dioxide, trace elements, and water. Ozone can be manufactured from dry air or from an oxygen containing gas by passing the gas through an electric field of high potential sufficient to generate a corona discharge between the electrodes. This corona discharge is just under the energy level of an automotive spark plug. Ultraviolet light and shorter-wavelength radiation also causes oxygen to undergo conversion to $O_3$, which may be used for industrial wastewater. Ozone is a more potent germicide than hypochlorous acid by factors of 10-100 fold and disinfects about 3125 times faster than chlorine. However, ozone is highly unstable and must typically be generated on site. The measure of an oxidizer and its ability to oxidize organic and inorganic material is its oxidation potential (measured in volts of electrical energy). The oxidation potential of $O_3$ (−2.07 V) is greater than that of hypochlorous acid (−1.49 V) or chlorine (−1.36 V), the latter agents being widely used in water treatment. If used, ozone can typically comprise a very low concentration from about 0.1% to about 3% of the expansion fluid.

As used herein, the term "ozonator" means and refers to an apparatus for generating ozone and directing it to appropriate uses.

As used herein, "removing" refers to any treatment which results in the contaminant being rendered harmless or nonexistent. For example, removal can include actual separation or chemical reaction to form non-contaminant materials, e.g. via destruction of the contaminant.

As used herein, the term "sediment" means and refers to a soil layer or multiple soil layers comprising loose rock, typically with a variety of organic debris.

As used herein, the term "slurry sample" refers to a liquid sample containing a solids content which is more than incidental solids debris. Although the percent solids can vary considerably, a slurry sample can have from 2% to 95% by weight of solids. High solids (e.g. 20% to 70%) and low solids (e.g. 2% to 15%) slurries can be of particular interest in the present invention. Contaminated slurries can also include those substantially free of solids, e.g. non-slurry samples.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. For example, inorganic contaminants such as manganese ions require significantly different treatment than would a bacterial contaminant in order to effectively remove the same. Manganese ions can be removed via precipitation or chelation, while bacteria are more typically treated using a suitable biocide or oxidizer.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Embodiments of the Invention

The present invention provides a method of removing contaminants from fluid samples, particularly slurry samples. The method includes the steps of pressurizing the sample, injecting the sample with an expansion fluid, and depressurizing the sample. The sample can be pressurized by directly injecting the expansion fluid into the sample. Separate pressurization and injection are not necessary and often can be effectively done in one single step. For example, a chelating agent can be preloaded into the sample prior to pressurizing with air only or other expansion fluid. After pressurizing, the sample is depressurized such that the expansion fluid forms microbubbles in the sample. The microbubbles disrupt the solids within the sample in a manner sufficient to increase decontamination efficiency. The pressurizing and depressurizing steps are then repeated at least once.

The duration of each of the pressurizing and depressurizing steps can be varied based on a number of factors including, but not limited to, the nature or quantity of the sample, the magnitude of contamination of the sample, the type of expansion fluid being injected, the change in pressure during each of the pressurization or depressurization steps, and the like. The pressurizing and depressurizing steps can have a time duration varying from seconds to minutes for the individual steps depending on the particular system of contaminants and expansion fluids. Similarly, the number of repetitions of the pressurization, injection, and depressurization steps can also be varied from 2 to 100 times. In one embodiment the number of repetition of the pressurization, injection, and depressurization steps can be at least 3 times, such as from 3 to 15 times. As a guideline, optimal time duration and number of decontamination cycles can be readily determined for each contaminated fluid based on monitoring and/or testing.

The depressurizing step(s) in the method of the present invention can result in any pressure reductions sufficient to create microbubbles. Typically, this can range from about 10 psi to about 1000 psi, although pressure drops outside this range can also be suitable. In one embodiment, the depressurizing step results in a pressure reduction of the sample of from 40 psi to about 200 psi. In one embodiment, depressurization step results in a pressure reduction of from 100 to 500 psi. In another embodiment, the pressure differential during the depressurization step results in a pressure reduction of at least 75 psi. In yet a further embodiment the pressure reduction during the depressurization step leaves the slurry sample at ambient pressure.

The methods of the present invention are advantageous for numerous reasons. For example, in one aspect of the invention the formation of microbubbles can provide abundant interfacial regions near the gas-liquid films, which provide favorable partitioning zones for extracting and concentrating into the films harmful chemical and biological agents. In another aspect the present invention the nucleation and growth of microbubbles containing a disinfectant such as $O_3$ can occur at the energetically favorable (non-wetting) surface of particulate matter or microorganism, thereby accentuating the exposure of potential pathogens present in the sample to $O_3$.

Another advantage of the present invention is the repetition of the pressurizing, injecting, and depressurizing of the sample. The repetition of these steps provides enhanced degradation of the solid particles and enhanced decontamination efficiency due to the increased exposure of the contaminants. The elevated pressure caused by the pressurization step enables the expansion fluid to effectively penetrate the pores of particulate matter that often shields harmful chemicals and microbes. When the expansion fluid includes an oxidizing agent or when the penetration of the expansion fluid occurs in the presence of an extraction agent or biocide, the liquid entering the pores carries such agents to the contaminants.

When the contaminant is a living cell, such as a bacterial cell, the injection of an expansion fluid containing an oxidizing agent into the sample can allow for the infusion of the oxidizing agent into the cell when the oxidizing agent can disrupt cell function. Additionally, when the sample is depressurized the rapid expansion of the fluid can cause the cell to burst, providing the disinfection.

The expansion fluid can be introduced into the contaminated sample at different times, although in each scenario the expansion fluid must be in contact and dissolved at least partially in the slurry sample before decompression is to proceed. It is important that the expansion fluid and the slurry sample are allowed to contact and reach some degree of dissolution prior to decompression. In one embodiment of the present invention, the expansion fluid and/or separate additives such as phase transfer agents or chelating agents can be added to the contaminated sample before the pressurizing step. In another embodiment, the slurry sample can be injected with an expansion fluid during or after the pressurizing step. In another embodiment, the repetition of the pressurizing step and the depressurizing step can be performed without repetition of injecting additives such as extraction agents or other materials. Additionally, when repeated, the pressurizing step can result in a different pressure increase when compared to the initial or first pressurizing step. Similarly, when repeated, the depressurizing step can result in a different pressure reduction as compared to the initial depressurization step. Thus, the cycling of pressure can have varying high and low pressures or can have substantially the same high and low pressures. In one aspect of the invention, the slurry sample can be heated sufficiently so that the slurry sample can be super saturated with the expansion fluid.

A variety of expansion fluids can be used in the methods of the present invention. Non-limiting examples of suitable expansion fluids can comprise or consist essentially of ozone, chlorine, air, nitrogen, argon helium, water vapor, compressible liquids, and the like. Mixtures of expansion fluids can also be used in the invention. Although not required, typical expansion fluids can be a gas at STP conditions. In one embodiment, the expansion fluid can comprise a pressurized liquid which is saturated with a gas such as air, ozone, nitrogen, argon, helium, combinations thereof, and the like. When the expansion fluid is a gas, the elevated pressure applied during the pressurizing step can enable the dissolved gas to effectively penetrate the pores of particulate matter in a slurry sample or can cause liquefaction of the fluid. Particulates and agglomerations of debris often shield harmful chemicals and microbes from contact with suitable decontaminating agents. When the gases or liquids which have penetrated the particles expand during the depressurizing step, they can cause the solid particle to explode, partially disintegrate, or at the very least cause the pores of the particulate matter to expand thus enhancing the exposure of target chemicals and microbes. For example, when a slurry sample contains bacteria, the pressurizing step can allow an expansion fluid to enter the protoplasm of the bacteria. During the depressurizing step the rapid expansion of the gaseous expansion fluid can cause the cell to burst, thereby providing for disinfection and effective removal of the bacterial contamination.

In another embodiment, the expansion fluid can include or be an oxidizing agent or function in the presence of an extraction agent already added to the slurry. Thus, in some cases, the expansion fluid can consist essentially of the active agent, while in other embodiments the expansion fluid acts as a carrier for such agents. In an embodiment, the expansion fluid can be ozone or an ozone containing fluid such as a liquid having ozone dissolved therein, or a gas-ozone mixture. In another embodiment, the expansion fluid can include an oxidizing agent such as, but not limited to, ozone; perchlorate, permanganate, hydrogen peroxide, chlorine gas, phenolic compounds, and combinations thereof. Examples of extraction agents which may be used include, but are not limited to, phase transfer agents, chelating agents, or combinations thereof. Suitable phase transfer agents can include, but are in no way limited to, quaternary ammonium salts, crown ethers, phosphonium salts, sulfonium salts, and combinations thereof. Generally, any chelating agent known in the art can be used, although selection of a desired chelating agent may depend on the nature and quantity of the contaminants being removed from the slurry sample. In one embodiment, the chelating agent included in the expansion fluid can be ethylenediaminetetraacetic acid (EDTA), although other chelating agents can include β-diketones, dithiocarbamates, ethylenediamine N,N-diacetic acid (EDDA), or other suitable agents. The expansion fluids may also include other disinfectant compounds known in the art such as, but not limited to, biocides or the like. The particular choice of decontamination agents can depend on the contaminant and slurry sample composition and are usually readily determined based on routine experimentation and experience in light of the disclosure herein.

In an embodiment, the process for the removal of contaminants from a contaminated sample can be further aided by some form of agitation during at least one of the steps of pressurizing, injecting, or depressurizing. Examples of agitation means include, but are not limited to stirring, shaking, ultrasound, and the like. It is noted multiple means of agitation can be combined during any given step of contaminant removal. Agitation can also be sufficiently achieved solely via degassing and movement of microbubbles during the depressurizing step with significant energy savings.

Slurry samples which can be treated by the method of the present invention generally have a solids content of from 2% to 95% by weight. In one embodiment, the slurry sample has a relatively high solids content of from 35% to 50% by weight. High solids content slurries can range from flowable slurries to thick pastes. In each case, treatment and handling can differ, although application of the present invention can be effective to remove contaminants. In another embodiment, the slurry sample has a relatively low solids content of from 2% to 15% by weight. The slurry samples can be either natural or man made and can have liquid components which include water, organic solvents, or mixtures thereof. The solid components of the slurry samples can be from any environmental source so long as the solid components can take the form of a slurry. In one embodiment, the slurry sample is a sediment slurry sample. Other examples of slurry samples can include widely varied amounts of solids present, but are not limited to contaminated drinking water, industrial wastewater, mine wastewater, sewage, surface water, groundwater, water containing petroleum chemicals produced during oil and gas production, other natural waters mixtures of these slurries, and the like. Produced water has the problem of dispersed and dissolved oil in it. These oil contents can show up as volatile solids and dissolved solids. At low levels, hydrocarbon contamination causes oil sheen on water surfaces which is problematic for discharge to coastlines or use in many applications.

The methods of the present invention can be used to remove a wide range of contaminants from a slurry sample. Non-limiting examples of such contaminants include persistant bioactive toxics (PBTs) such as polychlorinated biphenyls (PCBs), polyaromatic hydrocarbons (PAHs), and the like; viruses such as Echovirus, Hepatitis A and E, Rotavirus and Noroviruses (i.e., Norwalk-like viruses); enteric bacterial pathogens such as *Escherichia coli, Salmonella* species, *Shi-* gella species, *Vibrio cholerae*; and combinations thereof. Other examples of contaminants include but are not limited to acenaphthene, acenaphthylene, acrolein, acrylonitrile, aldrin, alpha-endosulfan, alpha-lindane, anthracene, antimony, aroclor 1016, aroclor 1221, aroclor 1232, aroclor 1242, aroclor 1248, aroclor 1254, aroclor 1260, arsenic, asbestos (friable), benz(a)anthracene, benzene, benzidine, benzo(a)pyrene, benzo(b)fluoranthene, benzo(ghi)perylene, benzo(k)fluoranthene, benzyl butyl phthalate, beryllium, beta-endosulfan, beta-lindane, bis(2-chloro-1-methylethyl)ether, bis(2-chloroethoxy)methane, bis(2-chloroethyl)ether, bis(2-chloroisopropyl)ether, bis(2-ethylhexyl)phthalate, bis(chloromethyl) ether, 4-bromophenyl phenyl ether, cadmium, camphechlor, carbon tetrachloride, 4-chlor-m-cresol, chlordane, chlorobenzene, chlorodibromomethane, chloroethane, 2-chloroethyl vinyl ether, chloroform, chloromethane, 2-chloronaphthalene, 2-chlorophenol, 4-chlorophenyl phenyl ether, chromium, chrysene, copper, cyanide, DDD, DDE, DDT, delta-lindane, di-n-octyl phthalate, di-n-propylnitrosamine, dibenz(a,h)anthracene, 1,2-dibromoethane, dibutyl phthalate, 1,4-dichlorobenzene, 1,2-dichlorobenzene, 1,3-dichlorobenzene, 3,3'-dichlorobenzidine, dichlorobromomethane, 1,2-dichloroethane, 1,1-dichloroethane, 1,1-dichloroethylene, dichloromethane, 2,4-dichlorophenol, 1,2-dichloropropane, 1,3-dichloropropene (mixed isomers), dieldrin, diethyl phthalate, dimethyl phthalate, 2,4-dimethylphenol, 4,6-dinitro-o-cresol, 2,4-dinitrophenol, 2,4-dinitrotoluene, 2,6-dinitrotoluene, 1,2-diphenylhydrazine, endosulfan sulfate, endrin, endrin aldehyde, ethylbenzene, fluoranthene, fluorine, gamma-lindane, heptachlor, heptachlor epoxide, hexachloro-1,3-butadiene, hexachlorobenzene, hexachlorocyclopentadiene, hexachloroethane, indeno(1,2,3-cd)pyrene, isophorone, lead, mercury, methanamine, n-methyl-n-nitroso, methyl bromide, n-nitrosodiphenylamine, naphthalene, nickel, nitrobenzene, 4-nitrophenol, 2-nitrophenol, pentachlorophenol, phenanthrene, phenol, pyrene, selenium, silver, 2,3,7,8-tetrachlorodibenzo-p-dioxin, 1,1,2,2-tetrachloroethane, tetrachloroethylene, 2,3,4,6-tetrachlorophenol, thallium, toluene, 1,2-trans-dichloroethylene, tribromomethane, 1,2,4-trichlorobenzene, 1,1,2-trichloroethane, 1,1,1-trichloroethane, trichloroethylene, 2,4,6-trichlorophenol, vinyl chloride, zinc, and combinations thereof. In one embodiment, the slurry sample can contain at least one contaminant selected from PAHs, MTBE, heavy metals, hydrocarbons, and combinations thereof.

In one specific embodiment of the present invention, the contaminated sample can be substantially free of solids such as water contaminated with soluble contaminants. Such soluble contaminants can include MTBE or any of the previously listed contaminants which are soluble in the primary fluid medium, e.g. usually water. Groundwater can be effectively treated by using a suitable system as described herein. However, in some embodiments the groundwater may be sufficiently confined so as to allow injection, pressurization and depressurization in situ. In yet another specific embodiment, the contaminated sample can include hydrocarbon contaminated water such as from gas or oil production. Most gas and oil production methods result in production of substantial amounts of water having hydrocarbons mixed therein. Ozone can be readily used to reduce, oxidize or convert hydrocarbon components into less harmful compounds (e.g. hydrogen gas, methane, etc.) or compounds which can be easily filtered. For example, ozonation in accordance with the present invention can result in formation of organic acids which agglomerate and can be easily filtered from the water. Such treatment can be performed sufficient to substantially eliminate oil sheen and/or dispersed oil so as to allow the water to be used for irrigation, discharge, or other purposes.

Application of the method of the present invention can generally reduce at least one contaminant in the slurry sample by at least 50%, although this can depend on the particular system. In an alternate embodiment, a process as disclosed herein can reduce at least one contaminant in the sample by at least 90%. In another embodiment, the method of the present invention can reduce at least one contaminant in the slurry sample by at least 95%. In a further embodiment, the method of the present invention can reduce at least one contaminant in the sample by at least 99%. In yet a further embodiment, the method can reduce at least one contaminant in the sample by at least 99.9%. However, actual percentage reductions can depend largely on the degree of contamination, type of contaminant, and the like.

Further embodiments include the use of the presently disclosed method for the conversion of carbon based compounds, such as, but not limited to petroleum chemicals found in water into smaller compounds. Water resulting from oil and gas production contains dispersed and dissolved oils (as volatile and dissolved solids), causing oil sheen on water surface when discharged. The oil content in the produced water also inhibits uses of the water as a valuable resource. Experiments have illustrated breaking of petroleum compounds into smaller fragment molecules with at least one treatment repetition of the method of the present invention. Ozonation products are typically organic acids that dissolved in the treated water or coagulated into solid form sufficiently that the solids can be readily separated from water, rendering the treated water suitable for discharge or further reuse.

The method of the present invention can be performed and/or implemented in situ or ex-situ. Various containment devices, vessels, containers, and/or treatment devices can be used with the method. Generally there is no limitation on the configuration or design of a container or vessel which can be used in the present invention so long as the steps of pressurizing and depressurizing as set forth herein can be accomplished. The devices can either be fixed, as within a treatment facility, or portable, such as for treatment of samples not easily removed or transported to a treatment facility. In one embodiment the method can be performed in a manner such that each repetition of the pressurizing, injecting, and depressurizing steps occur in a different container or vessel. In one embodiment, the containment device is a stainless steel vessel fabricated for pressurized contact of an expansion fluid, such as ozone gas, with a slurry sample.

In an embodiment, the method can be accomplished in a reaction vessel having two (2) stainless steel pieces, which are attached to form the reactor. In various reactors, vents, inlets, outlets and the like may be arranged about the reactor as needed for the application. Further, various reactors can work as a batch or as a flow reactor with respect to the slurry, and as a flow reactor with respect to a gas mixture.

In another embodiment, the method can be accomplished in a vessel having a continuous flow of a wastewater through at least one pressurizing chamber and at least one depressurizing chamber. Further embodiments of the method can be configured to be used with the bioremediation device disclosed in U.S. Ser. No. 11/247,014, titled "Remediation with Ozone of Sediments Containing Organic Contaminants" and U.S. Pat. No. 7,011,749 B2, issued Mar. 14, 2006, which are each incorporated herein by reference.

The method of the present invention provides for the additional removal of contaminants from a slurry sample by providing for heightened contact of the contaminants with decontaminating agents through interfacial regions of gas and liquid. These interfacial regions are favorable partitioning zones where concentrations of contaminants can form films of often hydrophobic chemical and biological agents. The films formed are more easily removed from the sample, thereby making elimination, removal, and/or disruption of the at least one contaminant from the sample possible without the loss of excessive sample.

Additionally, the interfacial regions of gas and liquid can facilitate interaction and/or reaction of the contaminants with the decontaminating agents, such as oxidizing agents or extraction agents. Further, the nucleation and growth of microbubbles which occurs at the energetically favorable (non-wetting) surface of particulate matter can accelerate the degradation of the contaminant. During depressurizing, microbubbles appear at particulate surfaces in the liquid phase. The sizes of microbubbles vary continually from their initial formation in sub-nanometer (<1 nm) range to visible range (e.g., m) in their final coalescing into large bubbles (e.g., cm) that rise rapidly to the water surface. The concentration of bubbles as well as the duration of their appearance depends on the degree of saturation with the gas (the expansion fluid), which in turn depends on the pressure employed, and the volumes of liquid and available headspace. A large amount of dissolved gas (expansion fluid) at high pressure will support more extensive bubble formation during depressurization, and the rate of growth of the bubbles along with the duration of the bubbles are controlled by the rate of depressurization. In addition, the rate, duration, and pressure employed during pressurization will determine the level of saturation. Thus, the pressure, pressurization rate, and depressurization rate can be fine tuned to support the concentration and duration of microbubbles, thus the abundance of reactive interfacial zone, for optimal treatment.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description or following examples. All changes which come within the meaning and range of equivalency of the claims are to be embraced within their scope.

EXAMPLES

Example 1

Treatment for Chemical and Biological Contaminants

Chemicals to be tested are selected from EPA's CCL among which are also suspected endocrine disruptor compounds. Selected compounds tentatively include chlorinated aliphatic (1,1-dichloroethane), pesticide intermediate (DDE), chlorinated aromatics (2,4,6-trichlorophenol), oxygen fuel additive (MTBE), heterocyclic explosive (RDX), and S, P-containing compound (disulfoton). Many chemicals on this list are already known to be degradable by ozone.

Coliform, Cyanobacteria and *Pseudomonas aeruginosa* can be used as model organisms to test disinfection efficiency. Cyanobacteria appears in EPA's $2^{nd}$ Drinking Water Contaminant Candidate list and *pseudomonas aeruginosa* is another opportunist pathogen of concern.

Chemical degradation and disinfection experiments can be carried out in a pressurizable reactor under varying conditions that includes pressure (50-200 psi), temperature (5-35° C.), contact time (5-45 min), ozone in air concentration (0.2-5%), and solid concentration (10 mg/L to 3000 mg/L with soil as an additive), and contaminant concentration (e.g., 10 ppb to 1000 ppb for chemicals, several 1000 MPN/100 mL for coliform).

Example 2

Treatment for Chemical and Biological Contaminants

The following Tables disclose experimental results obtained with processes disclosed and/or claimed herein. Specifically, a heightened ozonation technique (HOT) (i.e., ozonation was applied in pressurizing and depressurizing cycles) was applied to study standardized samples. An illustration of the results is presented in Table 1. As can be seen, all contaminants were degraded by 99.9%.

TABLE 1

HOT treatment results of, water spiked with benzene, bromobenzene

| Contaminant | Spiked concentration (ppm) | Degradation (%) |
|---|---|---|
| Benzene | 1.8 | >99.9 |
| Bromobenzene | 3.8 | >99.9 |
| Dichlorophenol | 3.9 | >99.9 |

Note:
Total initial contaminant moles to $O_3$ ratio = 1:10; HOT treatment was performed by 3 pressurizing-depressurizing repetitions (pressurizing took only 30 sec; slow depressurizing took 10 min; total ozonation time <2 min). The effluent gas was captured and found to contain no parent compounds or byproducts.

Further experiments have shown promise in field applications, as is presented in Tables 2-4.

TABLE 2

Pressurizing-depressurizing ozonation treatment of the Passaic River and Waukegan Harbor Sediments

| Passaic River Sediment | |
|---|---|
| PAHs before treatment | 55 ppm |
| PAH's after treatment | 13 ppm |
| Degradation of PAH's | 76% |

| | Waukegan Harbor Sediment | |
|---|---|---|
| 1 | Before Treatment | PCB 1.0 ppm; PAHs 24 ppm |
|   | After Treatment | PCB 0.6 ppm; PAHs 11 ppm |
| 2* | After Treatment | PCB Non-detect; PAHs 7.5 ppm |

Note on the experimental procedure:
1% ozone in air is introduced at about 1 L/min into the 1.5-L pressure vessel (see FIG. 1) containing 500 mL of 10% sediment slurry and brought to 100 psi within 45 sec; pressurizing with ozone stops and the pressure is slowly released in the next 5 min. The mixture is held at atmospheric pressure before the pressurizing and depressurizing is repeated 2-4 more times. The treated sediment is then Soxhlet-extracted and analyzed for remaining contaminant concentrations. It should be noted that a total ozonation time of less than 5 min was used to achieve these degradation results.
*10 rapid successive pressurizing-depressurizing ozonation completed in 10 min with no equilibration or hold times during or between repetitions ("non-detect" means < 0.05 ppm).

TABLE 3

Comparison of contaminants extraction results by 24-h Soxhlet extraction (1:1 v/v acetone:hexane) with the same after 5 repetitions of pressurizing-depressurizing (P-D) with air.

| Sediment | PAH's (ppm) | PCB (ppm) |
|---|---|---|
| Without the P-D repetitions | | |
| Passaic River | 24.6 | — |
| Waukegan Harbor | 12.1 | 1.10 |

TABLE 3-continued

Comparison of contaminants extraction results by 24-h Soxhlet extraction (1:1 v/v acetone:hexane) with the same after 5 repetitions of pressurizing-depressurizing (P-D) with air.

| Sediment | PAH's (ppm) | PCB (ppm) |
|---|---|---|
| With 5 P-D repetitions | | |
| Passaic River | 54.9 | — |
| Waukegan Harbor | 23.8 | 1.03 |

Note:
Extraction with the 5 P-D repetitions was completed within 20 min. The results demonstrate the effectiveness of the pressurizing-depressurizing repetitions in exposing and accessing the contaminants in sediment. Pressure used was 150 psi.

TABLE 4

Comparison of contaminants extraction results by 24-h Soxhlet extraction with air pressurizing-depressurizing (P-D) repetitions (both using 1:1 v/v acetone:hexane as solvent).

| Passaic River Sediment extracted by | PAHs (ppm) |
|---|---|
| Soxhlet extraction (24 H) | 44.8* |
| REM with 5 P-D repetitions (20 min) | 49.8 |

Note:
Extraction with the 5 P-D repetitions was completed within 20 min. The results demonstrate the effectiveness of the pressurizing-depressurizing repetitions in exposing and accessing the contaminants in sediment. Pressure used was 150 psi.
*When the Soxhlet-extracted sediment was subsequently extracted with REM P-D repetitions, 3.8 ppm were recovered.

Example 3

Treatment of Wastewater for Bacterial Elimination

Pressurized ozonation of a wastewater effluent using a modified pressure-filtration unit showed a 99.2% kill of Coliform bacteria with 3 repetitions of pressurizing and depressurizing under the same conditions as in Table 1.

Example 4

Rapid Extraction of Contaminants Using Organic Solvents

Compressed gas tanks (nitrogen/breathing air) are used to pressurize the reactor system. The sediments used for this study were from Passaic river (New Jersey). Waukegan Harbor (Michigan), St. Louis River (St. Louis) and Wells River. The wide variety of the sediments authenticates the reproducibility and dependability of this new extraction system. A 1:1 acetone and hexane (HPLC grade) mixture is used as a solvent for the PAH/PCB's extracted from the sediments. A calibration curve was prepared using pure anthracene, pyrene and benzo(a)pyrene. These chemicals were purchased from Supelco Co (neat 50 mg) and the solutions were prepared by dissolving neat PAHs in hexane (Sigma Aldrich, HPLC grade).

The purpose of this example is to illustrate an alternative and rapid technique for extraction of PAHs/PCBs from contaminated sediments. This involves series of pressurizing and depressurizing repetitions to release the PAH from contaminated sediments and dissolve them in a 1:1 acetone and hexane mixture.

A weighed amount of sediment along with 50 ml of 1:1 acetone and hexane mixture was introduced in the reactor. Both dry and wet sediments were analyzed for this study. For dry sediment analyses, the sediment was dried overnight and the dried sediment was soaked in water and free flowing water was removed to obtain the wet sediment with moisture content of around 30%. The nitrogen expansion gas was introduced from the bottom of the batch reactor (FIG. 1) till the desired pressure in reached in each of the extraction vessels 20 and 30. In practice, the number of extraction vessels can be varied and operated simultaneously. Valves 40, 45, 50 and 55 can be used to isolate each vessel during decompression and/or allow variations in pressures within each vessel independently.

The pressure gauges 1 and 11 at the top were used to measure the pressure in each reactor. The system was vigorously shaken for about one minute. Finally, the reactor was depressurized by releasing the gas using regulating valves 5 and 15 at the top. The exhaust, referring to the vented gas, was collected in a 1:1 acetone and hexane mixture to study if there was any loss of highly volatile PAH/PCB due to stripping. This controlled experiment verifies that no contaminant loss is due to stripping and venting. The pressurizing and depressurizing steps were repeated for 1-10 times.

The extract was collected from the bottom of the reactor and subjected to vacuum filtration to remove sediment particles. The filtered sample was passed through a florisil clean up column (Alltech, Part #204650) to remove unwanted organics, which can hinder the identification process. This was followed by a clean up process to remove sulfur (EPA Method 3660B). According to this method, transfer 1 ml of extract to a 50 ml clear glass bottle and add 1 ml Tetrabutyl ammonium sulfite reagent (Sigma Chemical Co.) and 2 ml of 2-propanol. Cap the bottle and shake for at least 1 minute, followed by addition of 5 ml of distilled deionized water. Shake the contents again for 1 minute and allow the sample to stand for 5-10 minutes. Transfer the top layer to a concentrator tube and concentrate the extract to 1 ml using gentle nitrogen purging before quantification.

The new extraction technique was compared with standard Sohxlet extraction (EPA Method 3540C) method. Extract solution from Soxhlet extraction (~20 g sediment) were concentrated by rotary evaporator (Büchi Rotavapor R-124, associated with Büchi Waterbath B-481, Büchi Switzerland). The concentrated extract was passed through a florisil clean up column followed by removal of sulfur using EPA method 3660B. The sample was concentrated to 1 ml using gentle nitrogen purging before analyzing it on GC/MS.

TABLE 5

PAH extracted from the Passaic River sediment based on REM (rapid Extraction method; i.e., the present invention of extraction with pressure cycles)

| Sample (g) | Moisture (%) | Pressure (psi) | Cycles | Gas | PAH (mg/Kg) |
|---|---|---|---|---|---|
| 5 | 30 | 100 | 10 | $N_2$ | 13.2 |
| 10 | 30 | 100 | 10 | $N_2$ | 12.6 |
| 15 | 30 | 100 | 10 | $N_2$ | 27.6 |
| 15 | 30 | 100 | 10 | $N_2$ | 26.4 |
| 15 | 0 | 100 | 10 | $N_2$ | 21.1 |
| 15 | 0 | 100 | 10 | $N_2$ | 20.1 |
| 15 | 30 | 50 | 10 | $N_2$ | 10.0 |
| 15 | 30 | 200 | 10 | $N_2$ | 27.1 |
| 15 | 30 | 150 | 10 | $N_2$ | 26.1 |
| 15 | 30 | 100 | 1 | $N_2$ | 8.2 |
| 15 | 30 | 100 | 3 | $N_2$ | 8.9 |
| 15 | 30 | 100 | 5 | $N_2$ | 11.0 |
| 15 | 30 | 100 | 7 | $N_2$ | 21.0 |
| 15 | 30 | 100 | 10 | Air | 25.1 |

Compared to 25.5 mg/Kg using Soxhlet extraction

Table 5 shows the amounts of PAH extracted by the REM method under different conditions. The amount of PAH extracted by the standard Soxhlet method was 25.5 mg/kg. Thus, the REM technology under the proper conditions can extract as much as the standard or more using appropriate conditions (e.g., >100 psi; 10 cycles) in a short time (e.g., 20 min) rather than 24 hrs required by Soxhlet extraction.

Example 5

Treatment of Soil Samples

Soil characteristics change following the pressurizing-depressurizing (P-D) repetitions. This example tested the benefits of opening up the soil structure using the P-D repetitions of the present invention. A polycyclic aromatic hydrocarbons (PAHs) contaminated sediment (24 ppm total PAHs) slurry was placed in a closed pressure vessel (300 mL of a 30% solid slurry in a 1.7 L volume), and an ozone/air mixture (1.5% $O_3$) was introduced at the bottom inlet and the reactor was pressurized and brought to 100 psi within 30 sec. The inlet was then closed and the reactor was allowed to vent through the top to atmospheric pressure over the next 5 min. The steps were repeated 2 more times. Upon dissembling of the reactor, the reaction mixture was found to be gel-like free-standing, with little free liquid. This is preliminarily attributed to the opening of pores and hydroxylation and carboxylation of soil organics by ozone, increasing hydrogen bonding of the surface groups that resulted in increased incorporation of the water into the soil mass. This experiment uses concentrated soil suspension to open up solids and pores. Similar experiments can be done in the presence of NOM (natural organic matter) and solids levels as found in streams and other natural waters.

Degradation of contaminants in the soil was determined. The treated sediment from above was dried, Soxhlet-extracted, and analyzed by GC-MS. About 40% of the PAHs were degraded within the first repetitions. In the absence of the P-D repetitions, the same level of degradation would have required over 1-hr of continuous ozonation with intense mechanical agitation (600-Watt of ultra sound irradiation). Moreover, the extensive incorporation of water with sediment into a gel was never observed before. The result shows a significant increase in moles of PAHs degraded per mole of ozone expended (in <1 min of ozonation).

Thus, while the present invention has been described above with particularity and detail in connection with what is presently deemed to be the most practical and preferred embodiments of the invention, it will be apparent to those of ordinary skill in the art that numerous modifications, including, but not limited to, variations in materials, temperature, function, order, and manner of operation may be made without departing from the principles and concepts set forth herein.

What is claimed is:

1. A method of removing contaminants from a contaminated sample of industrial wastewater, comprising:
   a) pressurizing the contaminated sample of industrial wastewater;
   b) injecting an expansion fluid into the contaminated sample;
   c) depressurizing the sample such that the expansion fluid forms microbubbles in the contaminated sample, wherein the microbubbles convert at least a portion of contaminants in the industrial wastewater to at least one product;
   d) repeating the steps of pressurizing and depressurizing at least once;
   wherein the sample is maintained within a common vessel through the pressurizing, depressurizing, and repeating steps.

2. The method of claim 1, wherein the contaminated sample is a slurry sample.

3. The method of claim 2, wherein the slurry sample has a solids content of 20% to 50% by weight.

4. The method of claim 2, wherein the slurry sample has a solids content of 2% to 15% by weight.

5. The method of claim 2, wherein the contaminated slurry includes soil, water, and at least one of a heavy metal and a radionuclide.

6. The method of claim 2, wherein the microbubbles in the contaminated sample mechanically disrupt solids within the contaminated sample and increase the decontamination efficiency by fracturing the solids thereby increasing exposed surface area of the solids.

7. The method of claim 1, wherein the contaminated sample is a contaminated fluid being substantially free of solids.

8. The method of claim 1, wherein the contaminated sample is a hydrocarbon contaminated water.

9. The method of claim 8, wherein the expansion fluid contains ozone.

10. The method of claim 1, wherein the depressurizing results in a pressure reduction of the sample of about 10 psi to about 1000 psi.

11. The method of claim 10, wherein the depressurizing results in a pressure reduction of the sample of 40 psi to about 200 psi.

12. The method of claim 1, wherein the depressurizing leaves the contaminated sample at ambient pressure.

13. The method of claim 1, wherein the injecting is also repeated at least once.

14. The method of claim 1, wherein the expansion fluid comprises ozone gas, chlorine gas, air, nitrogen, argon, helium, water vapor, or combinations thereof.

15. The method of claim 1, wherein the expansion fluid comprises a pressurized liquid saturated with a gas selected from the group consisting of air, ozone, nitrogen, argon, helium, and combinations thereof.

16. The method of claim 1, wherein the contaminated sample is agitated by at least one of stirring, shaking, and ultrasound during at least one of steps pressurizing, injecting, and depressurizing.

17. The method of claim 1, wherein the contaminated sample is agitated substantially only by intrinsic movement of microbubbles.

18. The method of claim 1, wherein the pressurizing and injecting occur substantially simultaneously.

19. The method of claim 1, wherein steps of pressurizing and depressurizing are repeated from 2 to 200 times.

20. The method of claim 1, wherein the pressurizing and depressurizing have a time duration of 20 seconds to 20 minutes for each complete cycle.

21. The method of claim 1, wherein the pressurizing step results in a different pressure increase when repeated.

22. The method of claim 1, wherein the depressurizing step results in a different pressure reduction when repeated.

23. The method of claim 1, wherein the liquid component of the contaminated sample comprises water, an organic solvent, or mixtures thereof.

24. The method of claim 1, wherein the expansion fluid or contaminated sample includes at least one of an oxidizing agent or an extraction agent.

25. The method of claim 24, wherein the oxidizing agent is selected from the group consisting of ozone, perchlorate, hydrogen peroxide, permanganate, chlorine gas, phenolic compounds, and combinations thereof.

26. The method of claim 24, wherein the extraction agent is selected from the group consisting of at least one phase transfer agent, at least one chelating agent, and combinations thereof.

27. The method of claim 1, wherein the contaminated sample contains at least one contaminant selected from the group consisting of PCBs, PAHs, DNAPL, organic solvents, halogenated organics, petroleum compounds, heavy metals, radionuclides, and combinations thereof.

28. The method of claim 1, wherein the method is used to convert hydrocarbon contaminants into smaller organic fragments.

29. The method of claim 1, wherein the steps of pressurizing and depressurizing are repeated at least 3 times.

30. The method of claim 1, wherein the contaminant being removed includes microorganisms.

31. The method of claim 30, wherein the microorganisms are destroyed.

32. The method of claim 1, further comprising filtering the at least one product from the sample.

33. A method of removing contaminants from a contaminated slurry sample of industrial wastewater, comprising:
   a) pressurizing the contaminated slurry sample of industrial wastewater by injecting an expansion fluid to at least 50 psi, said sample containing at least one contaminant, said expansion fluid being a reactive or nonreactive gas, which includes one or more decontaminating compounds selected from the group consisting of oxidizing agents, reducing agents, phase transfer agents, extraction agents, and combinations thereof;
   b) depressurizing the slurry sample to a second pressure which is at least 10 psi lower than the first pressure such that the injected expansion fluid forms microbubbles in the contaminated sample causing any solid particulates in the sample to fracture thereby exposing contaminants contained therein to the at least one decontaminating compound and increasing decontaminating efficiency; and
   c) repeating the steps of pressurizing and depressurizing from 2 to 200 times;
   wherein the sample is maintained within a common vessel through the pressurizing, depressurizing, and repeating steps.

34. A method of removing contaminants from a contaminated sample of produced water from oil or gas extraction, comprising:
   pressurizing the contaminated sample of produced water from oil or gas extraction, wherein the sample contains hydrocarbons;
   injecting an expansion fluid comprising ozone into the contaminated sample;
   depressurizing the sample such that the expansion fluid forms microbubbles in the contaminated sample, wherein the microbubbles convert at least a portion of the hydrocarbons to at least one ozonation product of hydrocarbons;
   repeating the steps of pressurizing and depressurizing at least once; and
   filtering the at least one ozonation product of hydrocarbons from the sample,
   wherein the sample is maintained within a common vessel through the pressurizing, depressurizing, and repeating steps.

* * * * *